United States Patent
Bunker et al.

(10) Patent No.: US 10,343,218 B2
(45) Date of Patent: Jul. 9, 2019

(54) CASTING WITH A SECOND METAL COMPONENT FORMED AROUND A FIRST METAL COMPONENT USING HOT ISOSTACTIC PRESSING

(71) Applicant: GENERAL ELECTRIC COMPANY, Schenectady, NY (US)

(72) Inventors: Ronald Scott Bunker, West Chester, OH (US); Douglas Gerard Konitzer, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 584 days.

(21) Appl. No.: 15/056,525

(22) Filed: Feb. 29, 2016

(65) Prior Publication Data

US 2017/0246688 A1    Aug. 31, 2017

(51) Int. Cl.

| | | |
|---|---|---|
| *B33Y 10/00* | (2015.01) | |
| *B33Y 80/00* | (2015.01) | |
| *B22C 9/04* | (2006.01) | |
| *B22F 3/105* | (2006.01) | |
| *B22F 3/15* | (2006.01) | |
| *B22F 5/00* | (2006.01) | |
| *B22F 5/10* | (2006.01) | |
| *B22F 7/06* | (2006.01) | |

(Continued)

(52) U.S. Cl.
CPC ............... *B22F 5/10* (2013.01); *B22C 9/04* (2013.01); *B22F 3/1055* (2013.01); *B22F 3/15* (2013.01); *B22F 5/007* (2013.01); *B22F 7/06* (2013.01); *B22F 7/08* (2013.01); *B28B 1/001* (2013.01); *B33Y 10/00* (2014.12); *B33Y 80/00* (2014.12); *Y02P 10/292* (2015.11); *Y02P 10/295* (2015.11)

(58) Field of Classification Search
CPC .......... B33Y 10/00; B33Y 80/00; B22C 9/04; B22F 3/1055; B22F 3/15; B22F 5/007; B22F 5/10; B22F 7/06; B22F 7/08
See application file for complete search history.

(56) References Cited

U.S. PATENT DOCUMENTS 4,703,806 A * 11/1987 Lassow .................... B22C 3/00
                                                       106/38.3
6,508,980 B1    1/2003 Sachs et al.
(Continued)

FOREIGN PATENT DOCUMENTS

| EP | 0 322 224 A2 | 6/1989 |
|---|---|---|
| GB | 573 740 A | 12/1945 |

(Continued)

OTHER PUBLICATIONS

Extended European Search Report and Opinion issued in connection with corresponding EP Application No. 17157929.5 dated Jul. 19, 2017.

*Primary Examiner* — Cam N. Nguyen
(74) *Attorney, Agent, or Firm* — Dority & Manning, P.A.

(57) ABSTRACT

The present disclosure generally relates to casting molds including a casting shell surrounding at least a portion of a casting core comprising a first metal component and a hot isostactic pressed second metal component around the first metal component. In one aspect, the first metal component may have a lower melting point than the second metal component. In another aspect, the second metal component may retain some metal powder grain structure.

11 Claims, 4 Drawing Sheets

(51) Int. Cl.
*B22F 7/08* (2006.01)
*B28B 1/00* (2006.01)

(56) References Cited

U.S. PATENT DOCUMENTS

| | | | | |
|---|---|---|---|---|
| 6,932,145 | B2 * | 8/2005 | Frasier | B22C 9/02 164/122.2 |
| 7,240,718 | B2 * | 7/2007 | Schmidt | B22C 9/04 134/166 R |
| 7,243,700 | B2 * | 7/2007 | Beals | B22D 29/002 134/166 R |
| 7,779,890 | B2 * | 8/2010 | Frasier | B22D 47/00 164/335 |
| 8,151,862 | B2 | 4/2012 | Pickrell et al. | |
| 8,512,808 | B2 | 8/2013 | Yousefiani et al. | |
| 8,550,144 | B2 * | 10/2013 | Frasier | B22D 47/00 164/23 |
| 8,851,151 | B2 * | 10/2014 | Frasier | B22C 9/02 164/122.1 |
| 9,079,803 | B2 * | 7/2015 | Xu | B33Y 10/00 |
| 9,364,888 | B2 * | 6/2016 | McBrien | F01D 5/28 |
| 9,415,438 | B2 * | 8/2016 | McBrien | F01D 5/28 |
| 9,482,103 | B2 * | 11/2016 | McBrien | F01D 5/28 |
| 10,035,731 | B2 * | 7/2018 | Xu | B22F 3/1055 |
| 2007/0114001 | A1 * | 5/2007 | Snyder | B22C 7/02 164/369 |
| 2007/0221359 | A1 * | 9/2007 | Reilly | B22C 9/103 164/516 |
| 2008/0011445 | A1 * | 1/2008 | Beals | B22D 29/002 164/132 |
| 2008/0169412 | A1 * | 7/2008 | Snyder | B22C 7/02 249/177 |
| 2013/0266816 | A1 | 10/2013 | Xu | |
| 2013/0305727 | A1 | 11/2013 | Yousefiani et al. | |
| 2014/0230247 | A1 | 8/2014 | Pickrell et al. | |
| 2015/0203411 | A1 | 7/2015 | Xu | |
| 2016/0288201 | A1 * | 10/2016 | Bullied | B22D 19/16 |

FOREIGN PATENT DOCUMENTS

| | | |
|---|---|---|
| GB | 872 714 A | 7/1961 |
| GB | 897 343 A | 5/1962 |
| GB | 898 140 A | 6/1962 |
| GB | 2 400 112 A | 10/2004 |
| WO | 94/11140 A1 | 5/1994 |
| WO | 2015/144665 A1 | 10/2015 |

* cited by examiner

CASTING WITH A SECOND METAL COMPONENT FORMED AROUND A FIRST METAL COMPONENT USING HOT ISOSTACTIC PRESSING

INTRODUCTION

The present disclosure generally relates to casting core components and processes utilizing these core components. The core components of the present invention may include a second metal component formed around a first metal component using hot isostactic pressing. The first metal component may include a lower melting point metal than the second metal component. The first metal component and the second metal component provide useful properties in casting operations, such as in the casting of superalloys used to make turbine blades for jet aircraft engines or power generation turbine components.

BACKGROUND

Many modern engines and next generation turbine engines require components and parts having intricate and complex geometries, which require new types of materials and manufacturing techniques. Conventional techniques for manufacturing engine parts and components involve the laborious process of investment or lost-wax casting. One example of investment casting involves the manufacture of a typical rotor blade used in a gas turbine engine. A turbine blade typically includes hollow airfoils that have radial channels extending along the span of a blade having at least one or more inlets for receiving pressurized cooling air during operation in the engine. Among the various cooling passages in the blades, includes serpentine channel disposed in the middle of the airfoil between the leading and trailing edges. The airfoil typically includes inlets extending through the blade for receiving pressurized cooling air, which include local features such as short turbulator ribs or pins for increasing the heat transfer between the heated sidewalls of the airfoil and the internal cooling air.

The manufacture of these turbine blades, typically from high strength, superalloy metal materials, involves numerous steps. First, a precision ceramic core is manufactured to conform to the intricate cooling passages desired inside the turbine blade. A precision die or mold is also created which defines the precise 3-D external surface of the turbine blade including its airfoil, platform, and integral dovetail. The ceramic core is assembled inside two die halves which form a space or void therebetween that defines the resulting metal portions of the blade. Wax is injected into the assembled dies to fill the void and surround the ceramic core encapsulated therein. The two die halves are split apart and removed from the molded wax. The molded wax has the precise configuration of the desired blade and is then coated with a ceramic material to form a surrounding ceramic shell. Then, the wax is melted and removed from the shell leaving a corresponding void or space between the ceramic shell and the internal ceramic core. Molten superalloy metal is then poured into the shell to fill the void therein and again encapsulate the ceramic core contained in the shell. The molten metal is cooled and solidifies, and then the external shell and internal core are suitably removed leaving behind the desired metallic turbine blade in which the internal cooling passages are found.

The cast turbine blade may then undergo additional post casting modifications, such as but not limited to drilling of suitable rows of film cooling holes through the sidewalls of the airfoil as desired for providing outlets for the internally channeled cooling air which then forms a protective cooling air film or blanket over the external surface of the airfoil during operation in the gas turbine engine. However, these post casting modifications are limited and given the ever increasing complexity of turbine engines and the recognized efficiencies of certain cooling circuits inside turbine blades, the requirements for more complicated and intricate internal geometries is required. While investment casting is capable of manufacturing these parts, positional precision and intricate internal geometries become more complex to manufacture using these conventional manufacturing processes. Accordingly, it is desired to provide an improved casting method for three dimensional components having intricate internal voids.

Precision metal casting using hybrid core components utilizing a combination of refractory metal and ceramic casting components is known in the art. Hybrid cores have been made that include portions of refractory metal and ceramic material. For example, See U.S. 2013/0266816 entitled "Additive manufacturing of hybrid core." The techniques used to manufacture hybrid cores disclosed in this application utilized conventional powder bed technology. Although hybrid cores offer additional flexibility for casting of superalloys for example in the casting of turbine blades used in jet aircraft engines, there remains a need for more advanced investment casting core technology.

SUMMARY

The present invention relates to a novel casting mold comprising a casting shell surrounding at least a portion of a casting core comprising a first metal component and a hot isostactic pressed second metal component around the first metal component. In one aspect, the first metal component may have a lower melting point than the second metal component. In another aspect, the second metal component may retain some metal powder grain structure.

In one embodiment the first metal component (e.g., a non-refractory metal component) may include aluminum, copper, silver, and/or gold and the second metal component (e.g., a refractory metal component) may include molybdenum, niobium, tantalum and/or tungsten. Either the first metal component and/or the second metal component may include an alloy.

One or more of the first metal component and/or the second metal component may be adapted to define within a cast component cooling holes, trailing edge cooling channels, or micro channels among other structures. The first metal component and/or the second metal component may also be adapted to provide a core support structure, a platform core structure, or a tip flag structure. Several metal components of first metal component and/or second metal component may be used in a single casting core, or may be used either alone or with other casting components in a ceramic casting core assembly.

The present invention also relates to methods of making a cast component comprising adding a metal powder to an interior space of a casting shell, wherein the metal powder surrounds at least a portion of a first metal component positioned in the interior space of the casting shell, exposing the metal powder to hot isostactic pressing to consolidate the powder into a second metal component, and removing the casting shell and the first metal component from the second metal component. In one aspect, the first metal component may have a lower melting point than the second metal component.

In another aspect, the first metal component and the second component may be assembled within a mold and/or shell and a ceramic slurry may be introduced to create the casting core.

In an example embodiment, at least one of the casting shell or the first metal component may be formed by additively forming the at least one of the casting shell or the first metal component on a layer-by-layer basis, comprising steps of: (a) consolidating through irradiation binder injection, and/or sintering a layer of powder in a powder bed to form a fused/sintered region; (b) providing a subsequent layer of powder over the powder bed; and (c) repeating steps (a) and (b) using at least two different powder composition corresponding to at least the casting shell or the first metal component to form at least a portion of the casting core.

DETAILED DESCRIPTION

Figure 1:
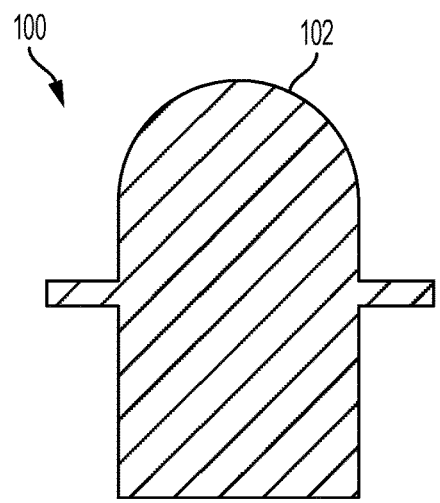
FIG. 1 illustrates a method of forming a cast component in accordance with an embodiment of the present invention.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Referring to the drawings wherein identical reference numerals denote the same elements throughout the various views, FIGS. 1-6 illustrate a method 100 of forming a casting component 110 in accordance with certain aspects of the present disclosure.

As illustrated in FIG. 1, a first metal component 102 may be used in the method 100 of forming the casting component 110. The first metal component 102 may include a low melting point metal and/or alloy including, but not limited to, at least one of aluminum, nickel, copper, gold, and/or silver or combinations or alloys thereof. In addition, first metal component 102 may include a metal that is not a refractory metal. However, the first metal component 102 may include any metal with a lower melting point than the second metal component 110. In an example embodiment, the first metal component 102 may be formed using an additive manufacturing technique to produce a desired and/or intricate shape.

Figure 2:
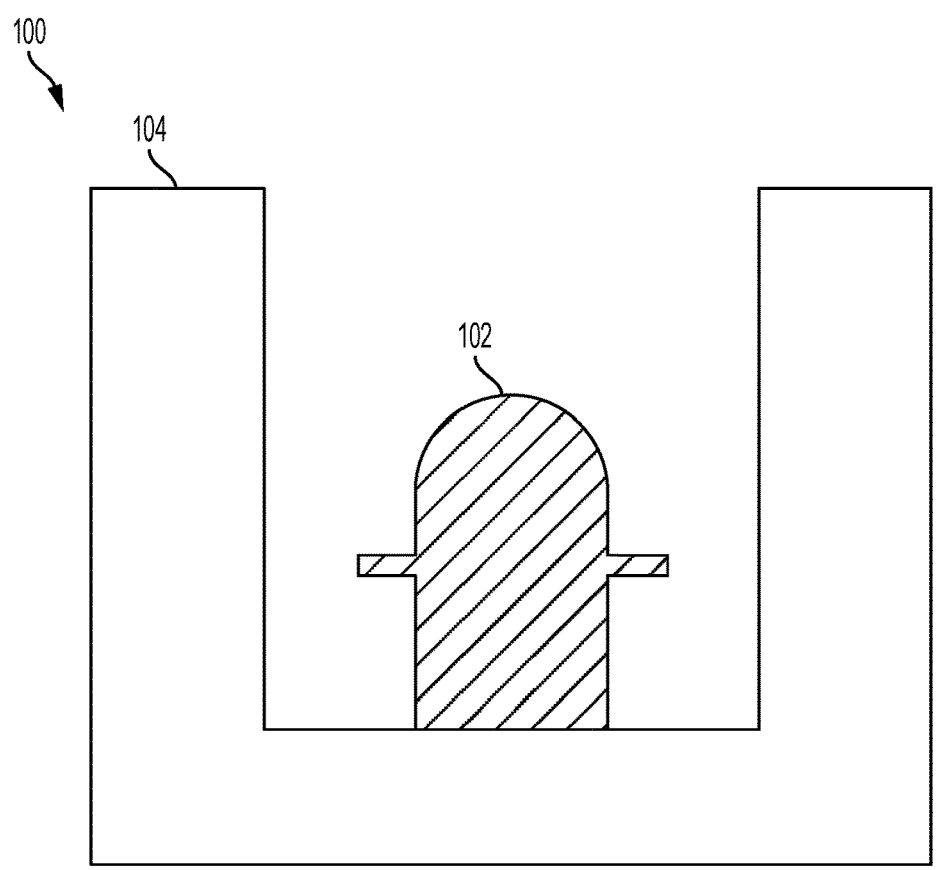
FIG. 2 illustrates a method of forming a cast component in accordance with an embodiment of the present invention.
Figure 7:
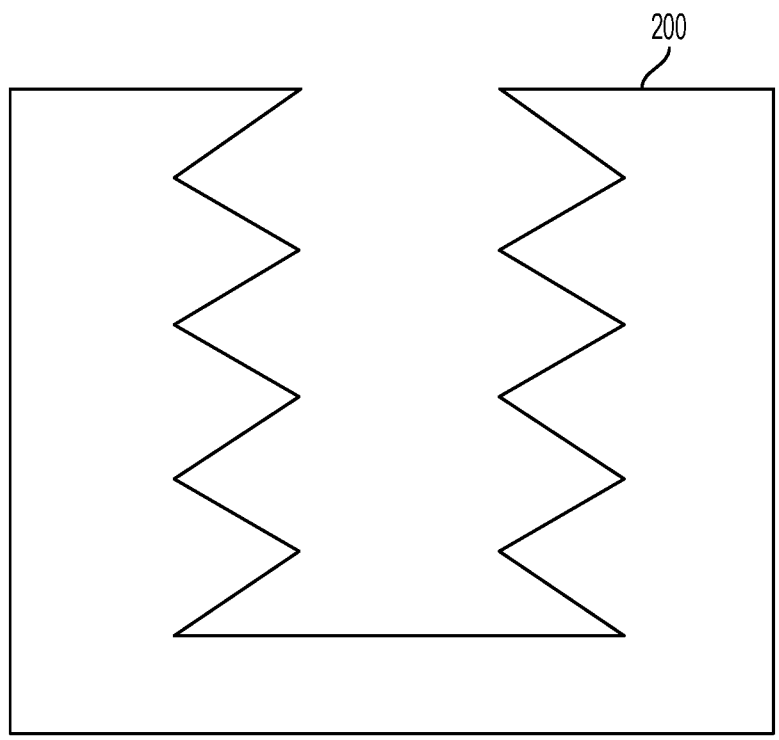
FIG. 7 illustrates a casting shell having a varied geometry that can be used with the present invention.

Referring to FIG. 2, a casting shell 104 may be formed surrounding the first metal component 102. In an aspect, the casting shell 104 may include a ceramic. Although the casting shell 104 is illustrated with a U-shape in FIG. 2, it will be understood by one of ordinary skill in the art that the casting shell 104 may take any shape and/or design depending on the desired shape of the casting component 110 without departing from the scope of the present invention. For example, a casting shell 200 with a more intricate design is illustrated in FIG. 7.

In an example embodiment, at least one of the casting shell or the first metal component may be formed by additively forming the at least one of the casting shell or the first metal component on a layer-by-layer basis, comprising steps of: (a) irradiating a layer of powder in a powder bed to form a fused/sintered region, (b) providing a subsequent layer of powder over the powder bed, and (c) repeating steps (a) and (b) using at least two different powder compositions corresponding to at least the casting shell or the first metal component to form at least a portion of the casting core.

Figure 3:
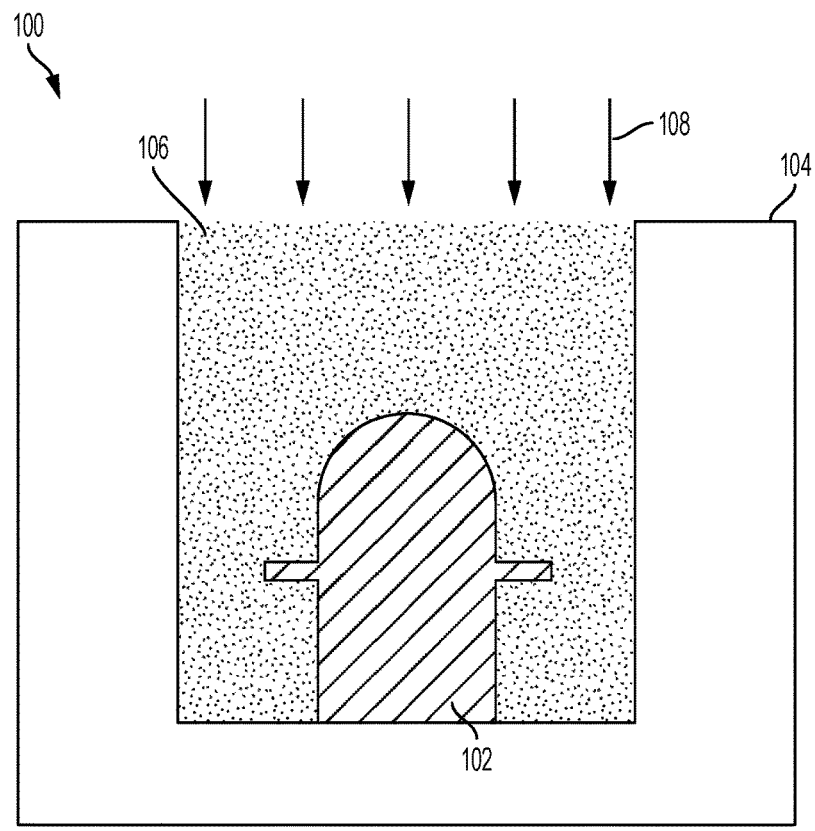
FIG. 3 illustrates a method of forming a cast component in accordance with an embodiment of the present invention.

A metal powder 106 may be added to an interior space of the casting shell 104 such that at least a portion of the first metal component 102 is surrounded by the metal powder 106, as illustrated in FIG. 3. In an aspect, the metal powder 106 may include, but is not limited to, at least one of molybdenum, niobium, tantalum and/or tungsten or combinations or alloys thereof. However, the metal powder 106 may include any metal powder with a melting point that has a higher than the first metal component 102 without departing from the scope of the present invention.

Figure 4:
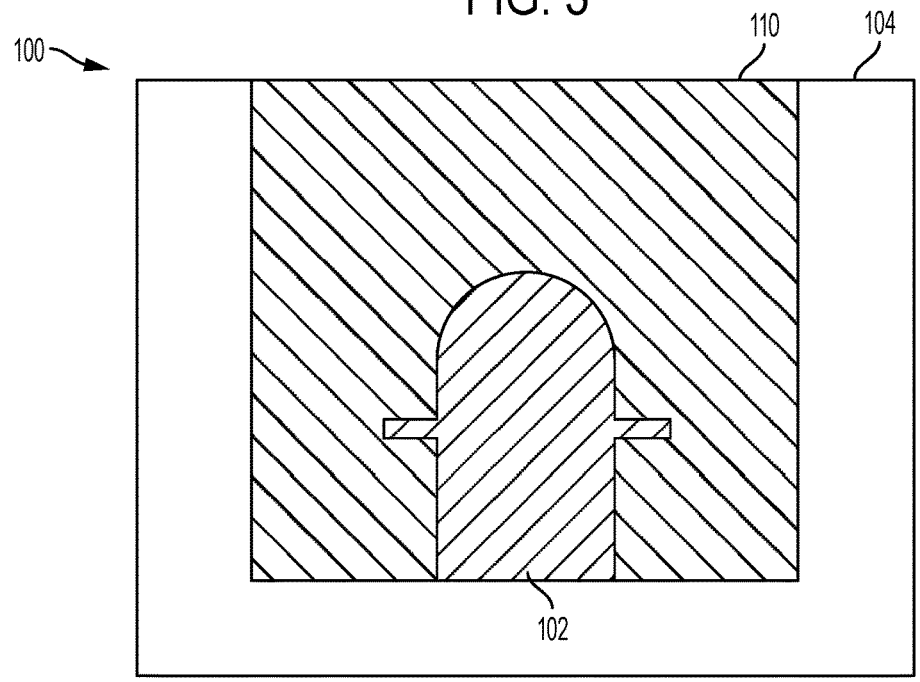
FIG. 4 illustrates a method of forming a cast component in accordance with an embodiment of the present invention.

In an aspect, the metal powder 106 may exposed to elevated temperature 108 and pressure 108 (e.g., isostatic pressure) to consolidate the metal powder 106 into a second metal component 110, as illustrated in FIG. 4. In an example embodiment, the casting shell 104 including the first metal component 102 and the metal powder 106 may be placed in a containment vessel (not shown). The containment vessel may be heated such that the pressure within the containment vessel is increased. Additionally, an inert gas (e.g., such as argon) may be pumped into the containment vessel to achieve a desired pressure level. For example, the pressure may be increased to between 50 MPa to 350 MPa depending on the metal to be consolidated. In addition, the temperature within the containment vessel may be increased to between 450° C. to 1,400° C. depending on the metal powder to be consolidated.

By forming the second metal component 110 using hot isostactic pressing, a second metal component 110 may be formed with specific structural/physical properties that differ from the structural properties of a metal component not formed using hot isostatic pressing. For example, a metal component formed using hot isostatic pressing may have fewer internal voids and/or a reduced microporosity than a metal component formed using other processes. In addition, the structural properties of the metal component may also be improved by using hot isostatic pressing. For example, the fatigue resistance of the second metal component 110 may be improved by formation using hot isostatic pressing.

Figure 5:
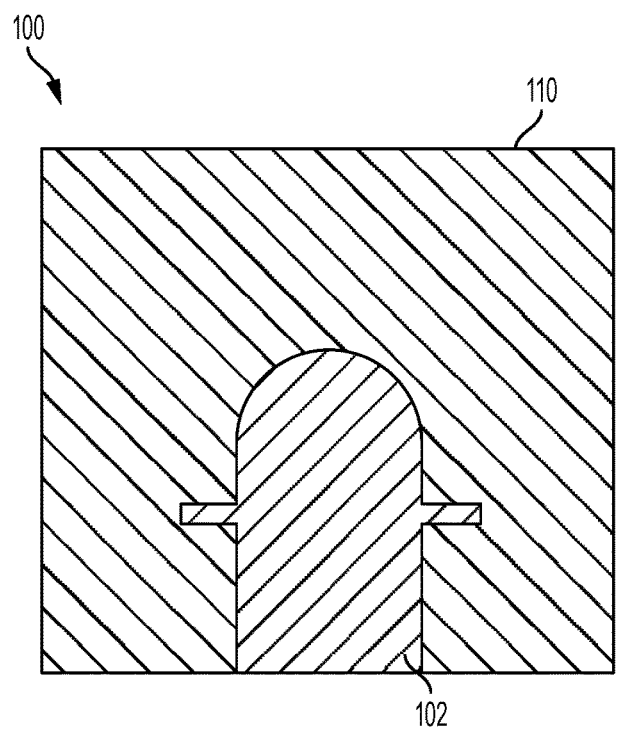
FIG. 5 illustrates a method of forming a cast component in accordance with an embodiment of the present invention.

Referring to FIG. 5, once the metal powder 106 is consolidated into the second metal component 110, the casting shell 104 may be removed from the first metal component 102 and the second metal component 110. For example, the casting shell 104 may be removed by breaking.

Figure 6:
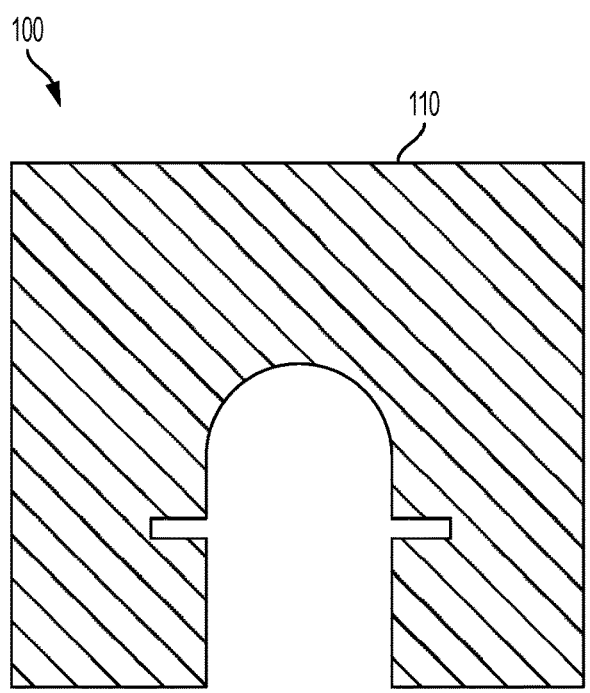
FIG. 6 illustrates a method of forming a cast component in accordance with an embodiment of the present invention.

Referring to FIG. 6, the first metal component 102 may be removed by melting the first metal component 102. In an example embodiment, the first metal component 102 may be chosen such that its melting point is lower than the melting point of the second metal component 110. In this way, the first metal component 102 may be melted without melting and/or causing damage to the second metal component 110.

In the above example, the first metal component 102 is used as a disposable pattern material, analogous to wax in the lost wax process for forming a turbine blade. In addition, the first metal component 102 may be used in conjunction with the second metal component 110 within a lost-wax process. In this case, both metals form a portion of the casting core. The casting core is then surrounded in wax and then a ceramic shell. The wax is removed and in addition, the first metal component 102 is melted away in the same or different heating step that is used to remove the wax. The first metal component 102 can be used as a gate material in the casting process that provides a passage for subsequently molded material after being melted away.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A casting mold comprising:
   a casting shell surrounding at least a portion of a casting core comprising a first metal component and a hot isostactic pressed second metal component around the first metal component,
   wherein the first metal component has a lower melting point than the second metal component and the second metal component retains some metal powder grain structure, and wherein the first metal component includes at least one of aluminum, nickel, copper, gold, or silver.

2. The casting mold of claim 1, wherein the first metal component includes an alloy.

3. The casting mold of claim 1, wherein the second metal component includes tungsten or a tungsten alloy.

4. The casting mold of claim 1, wherein the second metal component includes molybdenum or a molybdenum alloy.

5. The casting mold of claim 1, wherein the casting shell includes ceramic.

6. The casting mold of claim 1, wherein at least one of the casting shell or the first metal component is formed on a layer-by-layer basis.

7. A casting mold comprising:
   a casting shell surrounding at least a portion of a casting core comprising a first metal component and a hot isostactic pressed second metal component around the first metal component,
   wherein the first metal component has a lower melting point than the second metal component and the second metal component retains some metal powder grain structure, wherein the second metal component includes tungsten, a tungsten alloy, molybdenum or a molybdenum alloy.

8. The casting mold of claim 7, wherein the second metal component includes tungsten or a tungsten alloy.

9. The casting mold of claim 7, wherein the second metal component includes molybdenum or a molybdenum alloy.

10. The casting mold of claim 7, wherein the casting shell includes ceramic.

11. The casting mold of claim 7, wherein at least one of the casting shell or the first metal component is formed on a layer-by-layer basis.

\* \* \* \* \*